No. 613,352. Patented Nov. 1, 1898.
G. L. BOVEROUX.
BALL CASTER.
(Application filed Sept. 7, 1897.)
(No Model.)
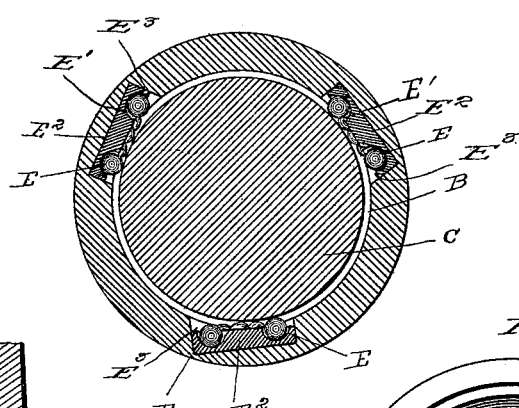
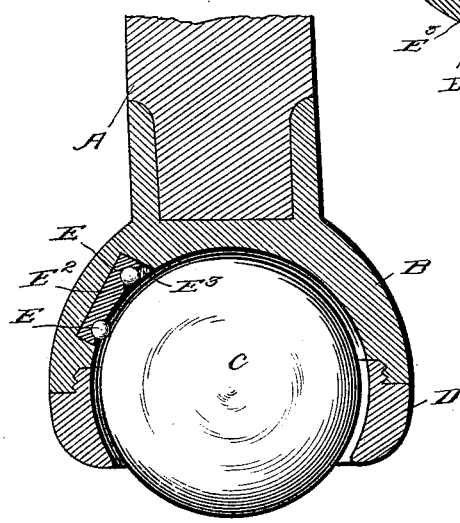
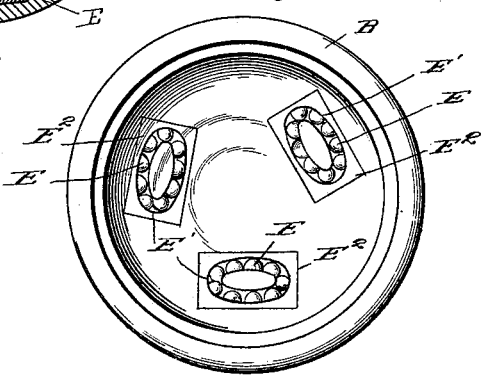
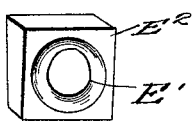
Witnesses
Maynard Harris
J. M. Eachus
Inventor
George L. Boveroux
By his Attorneys
E. F. Murdock & Co.
THE NORRIS PETERS CO., PHOTO-LITHO., WASHINGTON, D. C.

UNITED STATES PATENT OFFICE.

GEORGE L. BOVEROUX, OF OAKLAND, CALIFORNIA.

BALL-CASTER.

SPECIFICATION forming part of Letters Patent No. 613,352, dated November 1, 1898.

Application filed September 7, 1897. Serial No. 650,812. (No model.)

*To all whom it may concern:*

Be it known that I, GEORGE L. BOVEROUX, a subject of the German Emperor, residing at Oakland, in the county of Alameda and State of California, have invented certain new and useful Improvements in Casters for Furniture; and I do hereby declare the following to be a full, clear, and exact description of said invention, such as will enable others skilled in the art to which it most nearly appertains to make, use, and practice the same.

The present invention relates to improvements in casters, and more particularly to roller-casters.

It consists in the various matters hereinafter described and claimed.

In the accompanying drawings, Figure 1 is a view, partly in vertical section, of my present caster applied to an article of furniture. Fig. 2 is a bottom plan view of the casing, the roller being removed. Fig. 3 is a horizontal sectional plan view, and Fig. 4 is a detail perspective of a ball-receiving plate.

Referring now more particularly to the drawings, A represents the leg of a piece of furniture, and B the body portion of the casing or socket of the caster. Resting within this casing is the ball or spherical roller C, which is constructed of slightly-smaller diameter than the interior of the casing B and is formed concentrically therewith. To maintain the ball C within it, the socket is provided with the ring D. The ring D is secured to the socket B by means of the screw-thread construction, such as shown in the drawings. When the ring D is affixed upon the socket B, the interior surface of both coöperate to form a spherical shape. The smaller opening of the ring D is of less diameter than the ball C and would prevent its withdrawal from the socket B, and, as above stated, the diameter of the ball being only slightly less than the interior diameter of the socket B and ring D the movement of the ball within the socket in any direction is limited.

To permit the ball C to turn easily within the socket B, there have been provided ball antifriction-bearings in the casing, against which bearings the ball rests, and, as here shown, three such bearings are employed. The particular construction of these bearings is now to be considered.

Suitable recesses $E^3$ are formed in the inner face of the casing, each recess being, as shown in Fig. 3, deeper at one end than at the other. In each recess is inserted a metal plate $E^2$, which rests against the inner wall of the recess, whereby one end of each plate sets more deeply in the casing B than does the other end, and therefore one end of said plate approaches the ball C, while the other end recedes therefrom. A curved endless raceway $E'$ is formed in the exposed face of each plate, and in said raceways rest suitable balls E. It will thus be seen that the ball or balls at one end of a plate $E^2$ will bear against the ball C, while the remaining balls upon the plate will be out of contact with the spherical roller. Thus one or two balls within the race $E'$ are in bearing contact between the surface of the ball C and the bottom of the race or groove $E'$ at the same instant and at the same part of the groove or race. Therefore as the balls are moved into position in the race where their own rotation would be across the extension or length of the race or groove they are carried out of bearing engagement with the ball C.

In its operation it will be observed that as the furniture provided with this caster is moved in any direction the ball C will roll, as a wheel, in that direction. In rolling the ball C, resting, as it does, upon the antifriction-balls E, will endeavor to roll them in the same direction. By constructing the race in the endless curved form described it will be observed that the balls E against which the ball C is at any time bearing are permitted to roll in a line approximately parallel with the piece of furniture, or, in other words, in the direction of the surface of the ball C, with which they are engaged. In their movement around the circle of the race they cannot travel far before they will move at a tangent to the circle of the race. Before this, however, would result in the production of any great amount of friction they are removed away from the ball C by reason of the flat plane on which the race is constructed. As each of the balls E is moved in any direction it bears against the preceding balls within the race and exerts upon the column of balls a slight forward pressure, which has the effect of forcing each succeeding ball in its turn into the operative position or location to bear against the surface of the ball C. By this construction it will be observed that the balls E are permitted to act or travel approximately in the direction followed by the ball C in its rotation, and in doing so overcome the friction which would otherwise exist between the surface of the socket and the ball C.

The present device thus produces a caster which is efficient in its operation and can be constructed readily and accurately. No great care is necessary in producing the recesses $E^3$, and as the plates $E^2$ are made separately and then inserted into their recesses the raceways can be skilfully and accurately formed.

Having thus described this invention, I claim—

In a caster, a cup-shaped casing having a recess in its inner face, said recess being deeper at one end than at the other, a plate in said recess, an endless curved raceway in the face of said plate away from the casing, balls in said raceway, and a spherical roller in said cup-shaped casing, whereby one end of the plate with its balls is away from the roller while the other end of said plate approaches the roller so that only the ball or balls at one end of the plate bears or bear upon the roller at one time; substantially as described.

In testimony whereof I have hereunto set my hand this 28th day of August, 1897.

GEORGE L. BOVEROUX.

Witnesses:
BALDWIN VALE,
MAYNARD HARMS.